(12) United States Patent
Dibachi

(10) Patent No.: US 10,992,139 B1
(45) Date of Patent: Apr. 27, 2021

(54) ELECTRICAL POWER SYSTEM

(71) Applicant: Farid Dibachi, Lincoln, CA (US)

(72) Inventor: Farid Dibachi, Lincoln, CA (US)

( * ) Notice: Subject to any disclaimer, the term of this patent is extended or adjusted under 35 U.S.C. 154(b) by 0 days.

(21) Appl. No.: 16/575,777

(22) Filed: Sep. 19, 2019

Related U.S. Application Data

(60) Provisional application No. 62/734,172, filed on Sep. 20, 2018.

(51) Int. Cl.
| | | |
|---|---|---|
| *H02J 7/35* | (2006.01) | |
| *H02J 3/38* | (2006.01) | |
| *H02S 40/38* | (2014.01) | |
| *H02S 40/32* | (2014.01) | |

(52) U.S. Cl.
CPC .............. *H02J 3/385* (2013.01); *H02J 7/35* (2013.01); *H02S 40/32* (2014.12); *H02S 40/38* (2014.12)

(58) Field of Classification Search
CPC ..... H02J 3/385; H02J 7/35; H02J 9/02; H02S 40/32; H02S 40/38; H02S 50/10
See application file for complete search history.

(56) References Cited

U.S. PATENT DOCUMENTS

| | | | | |
|---|---|---|---|---|
| 8,780,592 B1* | 7/2014 | Jones | ...................... | H02M 1/12 363/39 |
| 9,000,748 B2* | 4/2015 | Huang | ...................... | G05F 1/67 323/283 |
| 9,293,619 B2* | 3/2016 | Moslehi | .......... | H01L 31/022441 |
| 9,368,965 B2* | 6/2016 | Arditi | ...................... | H02J 3/385 |
| 9,853,490 B2* | 12/2017 | Adest | ........................ | H02J 7/00 |
| 9,853,565 B2* | 12/2017 | Yoscovich | ............. | H02M 7/44 |
| 9,960,731 B2* | 5/2018 | Sella | .................. | G06Q 30/0242 |
| 9,977,452 B2* | 5/2018 | Abu Qahouq | ............ | G05F 1/67 |
| 9,991,843 B2* | 6/2018 | Alon | ..................... | H05K 7/1427 |
| 10,326,283 B2* | 6/2019 | Porter | ..................... | H02J 3/383 |
| 2009/0078300 A1* | 3/2009 | Ang | .................. | H01L 31/02021 136/244 |
| 2009/0141522 A1* | 6/2009 | Adest | ................... | H02H 7/1227 363/55 |
| 2009/0206666 A1* | 8/2009 | Sella | ....................... | H02J 1/102 307/43 |
| 2009/0218887 A1* | 9/2009 | Ledenev | ............. | H02J 13/0003 307/80 |
| 2012/0175963 A1* | 7/2012 | Adest | ..................... | H02M 7/42 307/82 |
| 2012/0175964 A1* | 7/2012 | Yoscovich | ............. | H02J 3/381 307/82 |

(Continued)

*Primary Examiner* — Daniel Cavallari
*Assistant Examiner* — Kalu Kelly Emeaba
(74) *Attorney, Agent, or Firm* — Plager Schack LLP; Mark H. Plager; Michael J. O'Brien

(57) ABSTRACT

An electrical power system includes a photovoltaic panel, configured to generate electrical power from a solar source. An output source is electrically coupled to the photovoltaic panel with a first maximum power point tracking charge controller. An inverter is electrically coupled to the photovoltaic panel with a second maximum power point tracking charge controller. A bi-directional buck/boost converter is electrically coupled to the first maximum power point charge controller and the second maximum power point charge controller and programmed with instructions to determine a photovoltaic panel current coming in from the photovoltaic panel. Then, direct an output source current to the output source. After that, direct a inverter current to the inverter.

2 Claims, 3 Drawing Sheets

(56) References Cited

U.S. PATENT DOCUMENTS

| | | | |
|---|---|---|---|
| 2012/0281444 A1* | 11/2012 | Dent | H02J 9/061 |
| | | | 363/56.01 |
| 2013/0194706 A1* | 8/2013 | Har-Shai | H02J 1/00 |
| | | | 361/42 |
| 2014/0117756 A1* | 5/2014 | Takahashi | H02J 7/35 |
| | | | 307/23 |
| 2015/0021998 A1* | 1/2015 | Trescases | H02J 3/381 |
| | | | 307/46 |
| 2015/0137606 A1* | 5/2015 | Adest | H02J 1/00 |
| | | | 307/77 |
| 2015/0357821 A1* | 12/2015 | Grana | H02J 3/00 |
| | | | 307/71 |
| 2018/0123348 A1* | 5/2018 | Narla | H02J 3/381 |
| 2018/0123508 A1* | 5/2018 | Inoue | H02J 7/35 |
| 2018/0329382 A1* | 11/2018 | Somani | H02J 3/32 |
| 2019/0190400 A1* | 6/2019 | Vanderzaden | H02J 3/381 |
| 2020/0083715 A1* | 3/2020 | Yoscovich | H02J 3/381 |
| 2020/0235583 A1* | 7/2020 | Eizips | G05F 1/67 |

* cited by examiner

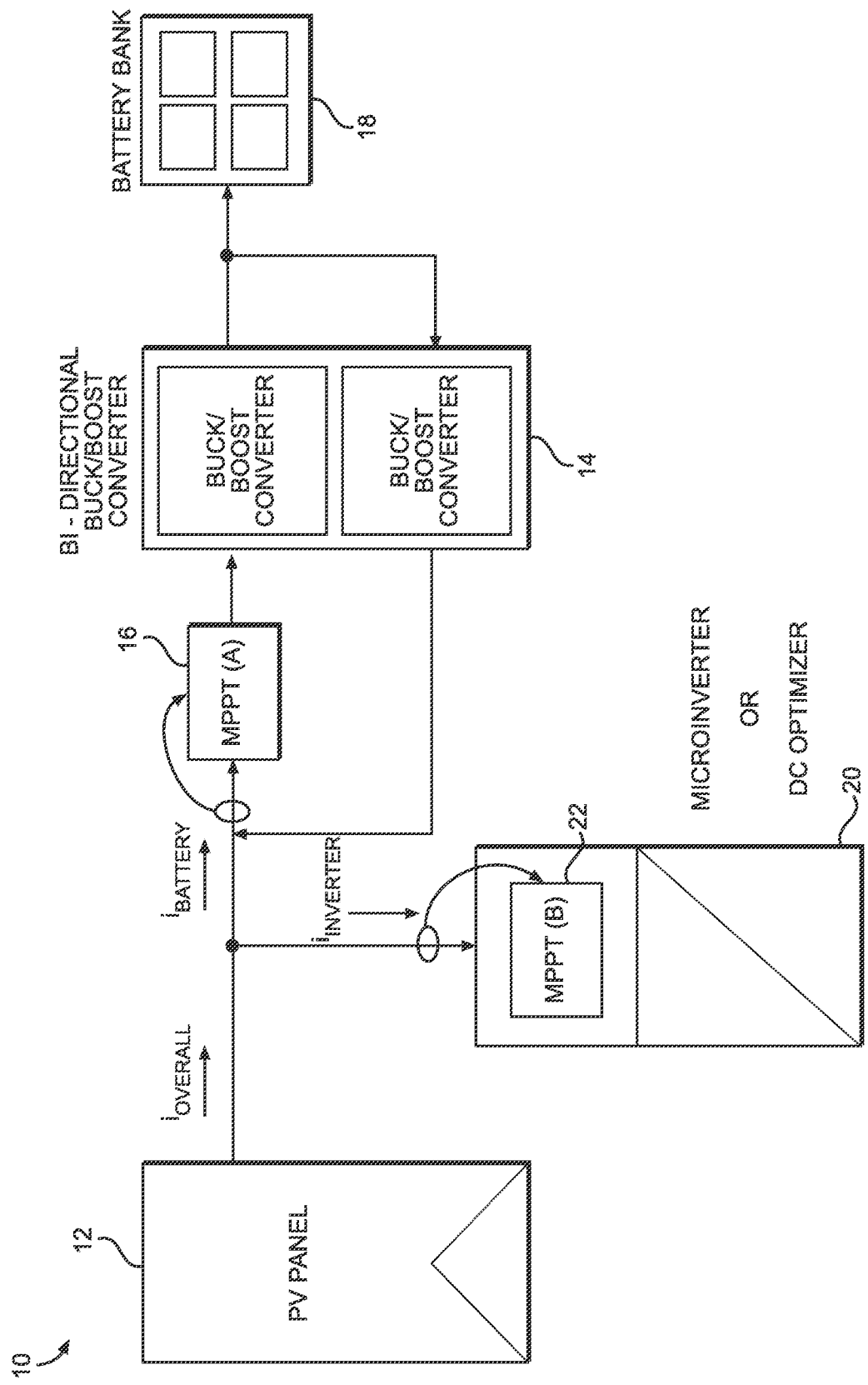
FIG 1: SINGLE SOLAR PANEL CONNECTED TO A MICROINVERTER OR DC OPTIMIZER

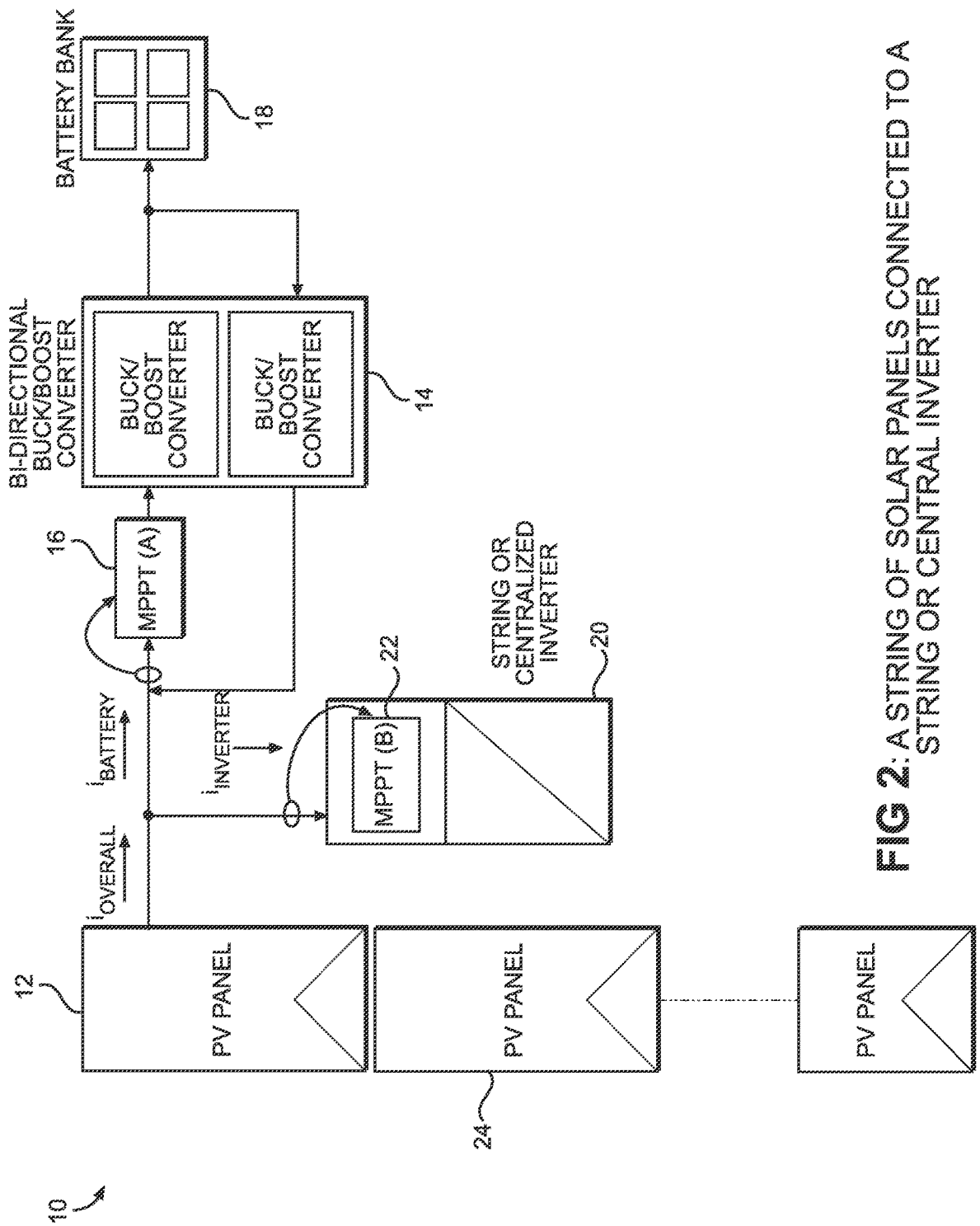
FIG 2: A STRING OF SOLAR PANELS CONNECTED TO A STRING OR CENTRAL INVERTER

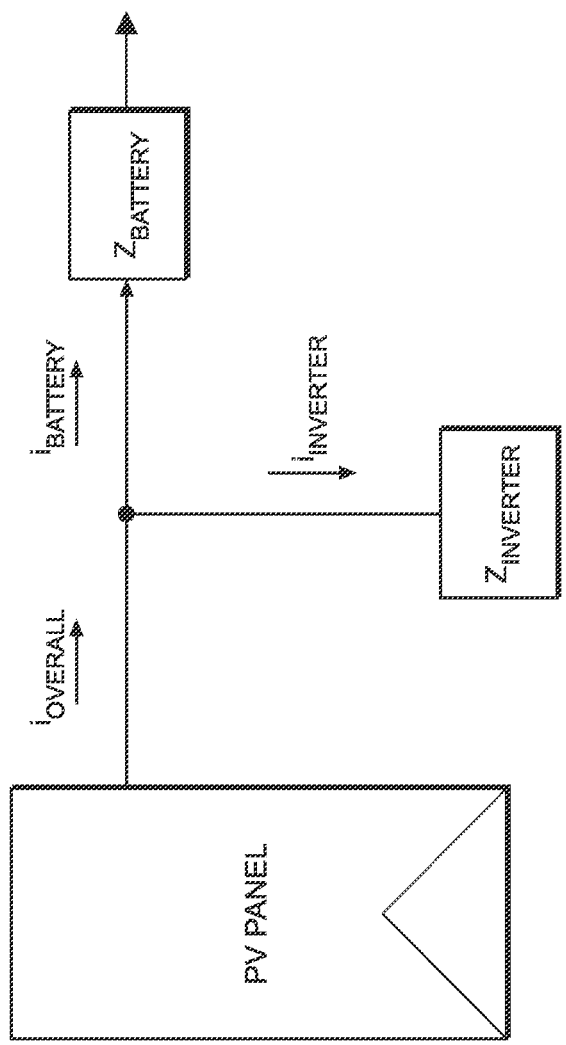
FIG. 3: IMPEDANCE-MATCHED COUPLING

ELECTRICAL POWER SYSTEM

RELATED APPLICATION

This application claims priority to provisional patent application U.S. Ser. No. 62/734,172 filed on Sep. 20, 2018, the entire contents of which is herein incorporated by reference.

BACKGROUND

The embodiments herein relate generally to generating electrical power from solar panels.

Prior to embodiments of the disclosed invention maximum power point voltage of a solar panel is highly dependent on the number of solar cells in a panel, solar irradiance, and atmospheric temperature. This requires efficient coupling so that the battery voltage is matched with the maximum power point voltage of the solar panel. This invention described here uses a single inverter to interface solar panels and batteries to the grid. Thus, eliminating the need to match the voltage of a solar panel to the voltage of the battery. Embodiments of the disclosed invention solve this problem.

SUMMARY

An electrical power system includes a photovoltaic panel, configured to generate electrical power from a solar source. An output source is electrically coupled to the photovoltaic panel with a first maximum power point tracking charge controller. An inverter is electrically coupled to the photovoltaic panel with a second maximum power point tracking charge controller. A bi-directional buck/boost converter is electrically coupled to the first maximum power point charge controller and the second maximum power point charge controller and programmed with instructions to determine a photovoltaic panel current coming in from the photovoltaic panel. Then, direct an output source current to the output source. After that, direct an inverter current to the inverter.

BRIEF DESCRIPTION OF THE FIGURES

The detailed description of some embodiments of the invention is made below with reference to the accompanying figures, wherein like numerals represent corresponding parts of the figures.

FIG. 1 shows a schematic view of one embodiment of the present invention;

FIG. 2 shows a schematic view of one embodiment of the present invention; and

FIG. 3 shows a schematic view of one embodiment of the present invention.

DETAILED DESCRIPTION OF CERTAIN EMBODIMENTS

By way of example, and referring to FIG. 1, one embodiment of an electrical power system 10 comprises a photovoltaic panel 12 electrically coupled to a bi-directional buck/boost converter 14 with a first maximum power point tracking charge controller 16. The bi-directional buck/boost converter 14 is further electrically coupled to at least one battery 18. The photovoltaic panel 12 is further electrically coupled to a microinverter 20 with a second maximum power point tracking charge controller 22.

The electrical power system 10 can scale as shown in FIG. 2. As a second photovoltaic panel 24, is electrically coupled to the first photovoltaic panel 12 in a string. The microinverter 20 is now replaced with a centralized inverter 26.

Regardless of the inverter chosen, the first maximum power point tracking charge controller 16 and the second maximum power point tracking charge controller 22 are electrically coupled to a microcontroller. The microcontroller could be imbedded in any system component or located separately. The microcontroller is programmed with instructions to: determine a photovoltaic panel current coming in from the photovoltaic panel 12. Then, direct an output source current to the at least one battery 18. Finally, direct a battery current to the bi-directional buck/boost converter 14.

The bi-directional buck/boost converter 14 operates where the solar panel maximum power point is equal to the microinverter maximum power point added to the battery stack maximum power point. That is:

$$MPP\text{overall} = MPP \text{ microinverter} + MPP \text{ battery converter.}$$

The maximum power point occurs at a maximum power point voltage which is set by the interaction of the photovoltaic panel 12 and the microinverter 20.

The bi-directional buck/boost converter 14 operates at the maximum power point voltage during the battery charge or discharge cycles. The bi-directional buck/boost converter 14 acts as a current sink during battery charge cycles. The bi-directional buck/boost converter 14 acts as a current source during battery discharge cycles. The amount of current sourced or sunk by the bi-directional buck/boost converter 14 at the operating voltage established by the microinverter 20 determines the relative impedance.

The battery voltage is independent of the solar panel maximum power point voltage since the bi-directional buck/boost converter 14 adjusts the batteries' operating voltage to the maximum power point voltage that is set by the inverter.

The electrical power system 10 provides highest energy output over different conditions and drive the portion of the energy directed to the at least one battery 18. When the value of energy or demand are low, the at least one battery 18 is charged and when the value of energy and demand are high the at least one battery 18 must be discharged in a manner that maximizes the economic value of the energy generated by the solar panel.

Turning to FIG. 3, the microcontroller can be programmed with an impedance-matching coupling. An impedance presented to the solar panel by the battery system is Zb. An impedance presented to the solar panel by the inverting system is Zinv.

The total impedance is driven by the maximum power point for the photovoltaic panel 12, bt the ratio Zb to Zinv drives the proportionality of the energy distribution. This proportionality is controlled by the first maximum power point tracking charge controller 16 which determines the current source and sink amount for the bi-directional buck/boost converter 14.

Impedance-matched coupling is useful since no relays are used in the integration of this solution. Previous systems used relays to connect and disconnect the sources of energy such as a solar panel or a discharging battery stack to the energy sinks such as inverting systems and battery stacks while being charged. Relays, as mechanical devices are notoriously prone to field failures. The impedance-matched coupling eliminates the use of mechanical or solid-state relays that are used in the integration of this solution. This is a direct consequence of the impedance-matched coupling technique which uses impedances (rather than relays) to stop energy flows or control the proportionality of the energy flow from each source to each sink of energy.

The method of connecting at least one battery 18 to photovoltaic panel 12 can use thermally insulative packaging. This packaging is made up of extruded, vacuum-formed or otherwise formed plastics to provide the necessary thermal insulation to thermally isolate batteries inside the system. A thin layer of trapped air on the interior side of this packaging further insulates the batteries from the ambient heat.

The electrical power system 10 can also use light emitting diodes (LEDs) as balancing elements. Instead of dissipating the balancing energy by converting the electrical energy in the battery to heat using a resistor, we proposed converting the electrical energy into light using LEDs. LEDs are efficient in converting most of the electrical energy that is delivered to them into light and very little into heat. This results in minimal self-heating for the battery modules which is critical to the long-term reliability of the overall system.

The electrical power system 10 can also use combination of techniques to simplify manufacturing, installation, commissioning and updating the system by eliminating the Power-on Reset Button. The electrical power system 10 is the first of its kind in energy storage systems where through a combination of logic and learning and self-healing techniques, the system is not required to ever be turned on, turned off, commissioned or restarted.

As used in this application an "inverter" is a power electronic device or circuitry that changes direct current (DC) to alternating current (AC). An inverter can include a microinverter, a DC optimizer, a string inverter, and a centralized inverter.

As used in this application an "output source" means anything that can use DC power, including batteries, DC electronics, motors, etc.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An electrical power system, comprising:
   a photovoltaic panel, configured to generate electrical power from a solar source;
   an output source, electrically coupled to the photovoltaic panel with a first maximum power point tracking charge controller; wherein the output source is at least one battery
   an inverter, electrically coupled to the photovoltaic panel with a second maximum power point tracking charge controller;
   a bi-directional buck/boost converter, electrically coupled to the first maximum power point charge controller and the second maximum power point charge controller;
   a microcontroller operatively coupled to the bi-directional buck/boost converter wherein the microcontroller is programmed with instructions to:
   determine a photovoltaic panel current coming in from the photovoltaic panel;
   providing impedance matched coupling for the photovoltaic panel, the output source, and the inverter;
   direct an output source current to the output source;
   direct an inverter current to the inverter;
   engage an output source charging cycle;
   adjust an impedance presented to the photovoltaic panel by the output source;
   adjust an impedance presented to the photovoltaic panel by the inverter; and
   operate as a current sink.

2. An electrical power system, comprising:
   a photovoltaic panel, configured to generate electrical power from a solar source;
   an output source, electrically coupled to the photovoltaic panel with a first maximum power point tracking charge controller; wherein the output source is at least one battery
   an inverter, electrically coupled to the photovoltaic panel with a second maximum power point tracking charge controller;
   a bi-directional buck/boost converter, electrically coupled to the first maximum power point charge controller and the second maximum power point charge controller;
   a microcontroller operatively coupled to the bi-directional buck/boost converter wherein the microcontroller is programmed with instructions to:
   determine a photovoltaic panel current coming in from the photovoltaic panel;
   providing impedance matched coupling for the photovoltaic panel, the output source, and the inverter;
   direct an output source current to the output source;
   direct an inverter current to the inverter;
   engage an output source discharging cycle;
   adjust an impedance presented to the photovoltaic panel by the output source;

adjust an impedance presented to the photovoltaic panel
  by the inverter; and
operate as a current source.

* * * * *